March 23, 1948. E. UTTERBACK 2,438,261
METHOD AND APPARATUS FOR CONVERSION OF FLUID HYDROCARBONS
Filed July 3, 1946
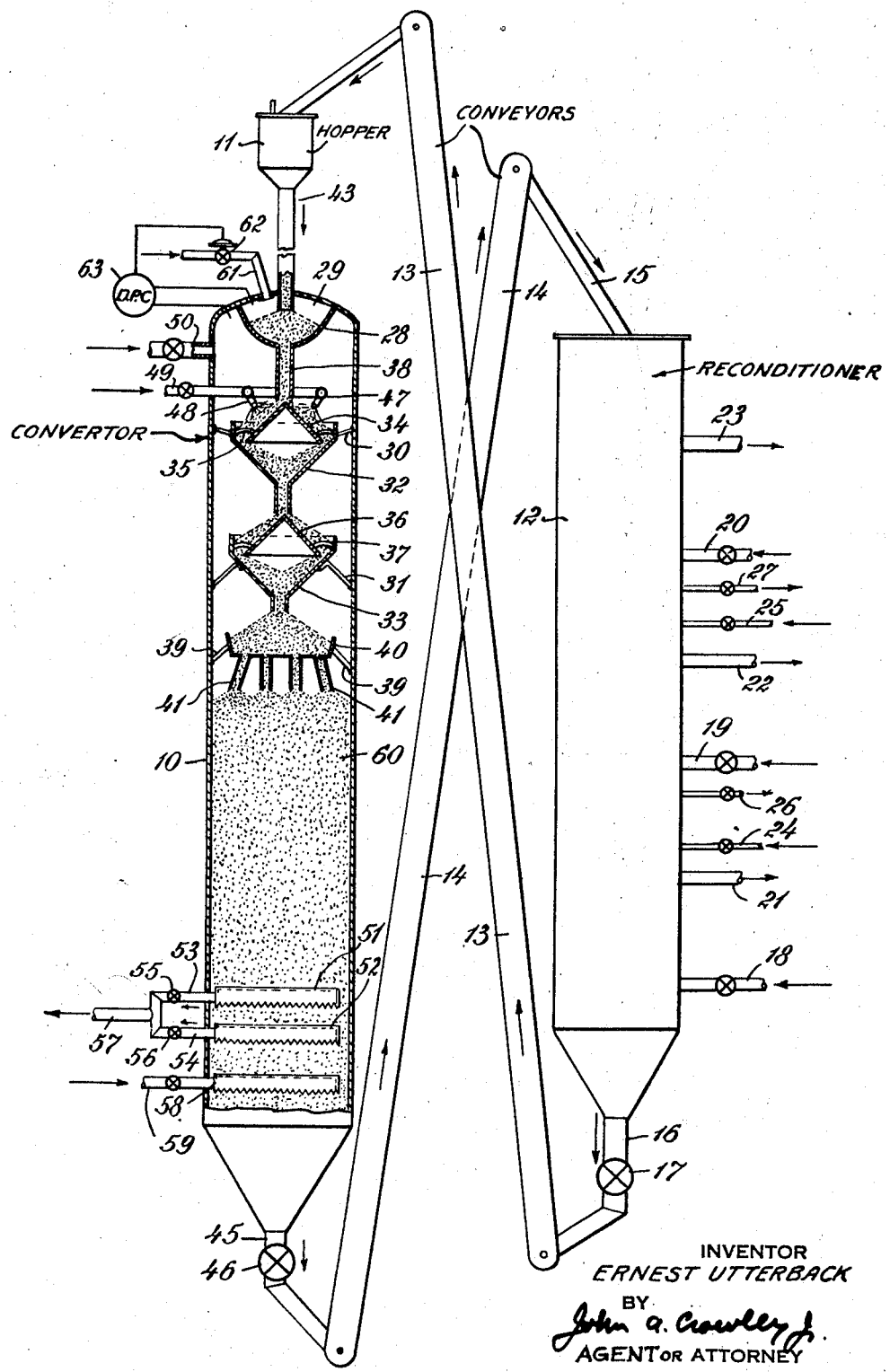
INVENTOR
ERNEST UTTERBACK
BY
John A. Crowley Jr.
AGENT OR ATTORNEY Patented Mar. 23, 1948

2,438,261

UNITED STATES PATENT OFFICE 2,438,261

METHOD AND APPARATUS FOR CONVERSION OF FLUID HYDROCARBONS

Ernest Utterback, New York, N. Y., assignor to Socony-Vacuum Oil Company, Incorporated, a corporation of New York Application July 3, 1946, Serial No. 681,223

15 Claims. (Cl. 196—52)

This invention has to do with a method and apparatus for conversion of high boiling liquid hydrocarbons or mixed phase hydrocarbons to lower boiling hydrocarbons in the presence of a moving particle form contact mass material which may or may not exhibit catalytic properties with respect to the conversion reaction. Typical of such processes is the catalytic conversion of heated liquid hydrocarbons to lower boiling gasoline containing gaseous products by the contacting of a high boiling liquid charge at temperatures of the order of 850° F. and upwards with a particle-form adsorbent catalytic material. Other exemplary processes are the thermal visbreaking, coking or cracking of liquid or mixed phase hydrocarbon charge by contact with heated particle-form inert contact materials.

This invention has specifically to do with conversion processes wherein the contact material is passed cyclically through a conversion zone wherein it flows as a substantially compact stream while being contacted with hydrocarbons to effect their conversion and through a regeneration or reconditioning zone wherein it is contacted with a suitable gas to condition it for re-use in said conversion zone.

In such processes wherein the contact material is catalytic in nature it may partake of the nature of natural or treated clays, bauxite, activated alumina or synthetic associations of silica, alumina or silica and alumina to which other substances such as certain metallic oxides may be added in small amounts for specific purposes. When the contact material is inert in character it may partake of the form of refractory materials such as zirkite, corhart material, or mullite or it may partake of the form of stones or metallic particles or balls. In order to insure practical capacity for gas flow through the compact mass of contact material particles in the conversion and regeneration zones, it has been found desirable to maintain the contact material particles within the size range about 3 to 100 mesh and preferably within the range about 4 to 20 mesh by Tyler standard screen analysis. While operation may be obtained using contact material particles of a size outside these ranges, the resulting operation is inferior.

When a liquid hydrocarbon charge is introduced onto a column of particle-form contact material in a conversion zone, there is a marked tendency for the liquid to channel downwardly through localized portions of the column cross section. As a result, uneven conversion of the charge results, most of the hydrocarbon charge being deprived of adequate contact with active or fresh contact material and a minor portion of the charge suffering from too much contact. Moreover, uneven temperature distribution across the conversion zone results as well as uneven deposition of carbonaceous contaminant on the contact material particles. When the hydrocarbon charge to the conversion zone consists of both liquid and gaseous hydrocarbons the above difficulties are increased because of the tendency for liquid hydrocarbons to channel through one portion of the contact material column while the gaseous hydrocarbons channel through another portion thereof.

A major object of this invention is the provision in a process for conversion of high-boiling fluid hydrocarbons in the presence of a column of moving contact material particles of method and apparatus for supplying of contact material and fluid hydrocarbons onto the contact material column within the conversion zone which method and apparatus overcome the above described difficulties.

Another object is the provision of a practical process for the simultaneous catalytic conversion of gaseous and liquid hydrocarbons in the presence of a moving mass of particle-form catalyst.

Another object is the provision in a continuous cyclic process for conversion of high boiling liquid or mixed phase hydrocarbons of an improved method and apparatus for hydrocarbon and contact material introduction into the conversion zone.

These and other objects of this invention will become apparent from the following discussion of the invention.

Before proceeding with this discussion certain terms used in describing and in claiming this invention will be defined. The term "gaseous" as used herein is intended to refer to a material existing in the gaseous phase under the particular operating conditions of pressure and temperature involved regardless of what may be the normal phase of that material under ordinary atmospheric conditions. The expression "contact material" is employed herein in a broad sense as covering solid particles which are suitable as a contacting or heat carrying agent for the particular conversion involved regardless of whether such solid particles exhibit a catalytic effect toward the conversion or not.

The invention may be best understood by reference to the single drawing attached hereto which is an elevational view, partially in section of a continuous cyclic system arranged according to this invention. In the drawing, there is shown a convertor 10, a supply hopper 11 thereabove, a regenerator or reconditioner 12 and conveyors 13 and 14 for transfer of contact material from the regenerator 12 to supply hopper 11 and from convertor 10 to reconditioner 12. The specific embodiment of reconditioner shown is a multi-stage regenerator adapted to regenerate particle-form contaminant bearing catalysts. It is provided with a catalyst inlet 15 at its upper end, an outlet conduit 16, bearing flow control valve 17 at its lower end and a plurality of pairs of spaced gas inlets and outlets along its length. In the drawing, gas inlets 18, 19, and 20 and outlets 21, 22 and 23 are shown. The pairs of gas inlet and outlets thus provide a series of spaced apart combustion stages. Between each of these stages cooling tubes, not shown, may be provided. Cooling medium may be supplied to these cooling tubes through inlets 24 and 25 and withdrawn through outlets 26 and 27. It will be understood that the form of regenerator shown is a preferred form but that invention is not considered to be limited to the specific form shown. Moreover, for some operations, for example, those wherein the contact material is an inert solid material, the vessel 12 may broadly take the form of a heater adapted to heat the inert material to a hydrocarbon conversion supporting level.

Looking now at the convertor 10, it will be seen that partitioning 28 provides within the upper end of vessel 10 a seal chamber 29 and within the remainder of vessel 10 a conversion chamber. In the form shown the vessel 10 is substantially circular in horizontal cross-sectional shape. Supported centrally within the upper section of the conversion chamber by means of rods 30 and 31 are vertically spaced funnels 32 and 33. The funnels 32 and 33 are of substantially less cross-sectional area than the vessel 10. Supported centrally above the funnels 32 and 33 by means of rods 35 and 37, respectively, are upright conical baffles 34 and 36, respectively. The cones 34 and 36 are of less diameter at their bases than the diameter of the upper portion of funnels 32 and 33 into which they extend so as to provide an annular space between each cone and each funnel for solid flow. Spaced below the lowermost funnel 33 is a basin 40 which is of less diameter than vessel 10 and which is supported laterally centrally within the vessel by means of rods 39. A plurality of conduits 41 depend from the bottom of basin 40 and terminate at a common level therebelow at a plurality of points which are substantially uniformly distributed across the horizontal cross-sectional area of vessel 10. A gravity feed leg 43 extends downwardly from hopper 11 into seal chamber 29 for supply of contact material. Contact material may pass from seal chamber 29 through conduit 38 to a point within the conversion chamber substantially centrally disposed directly over the uppermost cone 34. Contact material may be withdrawn from the lower section of the vessel 10 through conduit 45 bearing flow control valve 46. Within the upper section of the conversion chamber above cone 34 is positioned a ring type manifold 47 from which depend a plurality of spaced spray nozzles 48 so arranged as to direct a liquid spray towards the cone 34. A supply pipe 49 connects into the manifold 47. An inlet conduit 50 for introduction of gaseous material is provided in the upper section of the conversion chamber. Vertically spaced apart gas collecting members 51 and 52 are provided within the lower section of vessel 10. These members may conveniently take the form of inverted gable roofed troughs. Gas outlet pipes 53 and 54 bearing valves 55 and 56 respectively connect under collecting members 51 and 52, respectively. The pipes 53 and 54 are manifolded into the single outlet conduit 57. A gas distributing member 58 provided with inlet pipe 59 is positioned at a still lower level in vessel 10. It will be understood that these gas handling members in practice may be arranged in rows of horizontally spaced members rather than as single members.

In operation contact material existing at a temperature sufficiently high to support the desired conversion in convertor 10 without cooling to a temperature unsuitable for conversion during its passage through the conversion zone is supplied from hopper 11 through gravity feed leg 43 into the seal zone 29 against the gaseous pressure therein. While the use of the gravity feed leg is preferred, other suitable means may be substituted for introduction of contact material into seal zone 29 if desired. The contact material passes downwardly as a substantially compact stream from seal chamber 29 through the centrally disposed conduit 38 onto the apex of cone 34. The contact-materal slides downwardly over the surface of cone 34 and at the lower edge of cone 34 it passes into funnel 32 at which point it abruptly reverses its direction of flow. The process is repeated during the solid passage over cone 36 and funnel 33 therebelow. While two sets of cones and funnels are shown, it should be understood that the invention is not considered to be limited thereto. In some operations more than two sets of cones and funnels may be employed in series. A high boiling liquid hydrocarbon charge entering manifold 47 from pipe 49 is sprayed from nozzles 48 onto the contact material stream passing downwardly over the surface of cone 34. As the contact material slides downwardly over the surface of cone 34, the smaller particles and particularly the fines which may have accumulated in the system tend to settle to the bottom of the contact material stream. For this reason, there is not uniform deposition of the liquid oil on all the contact material flowing on cone 34 and the liquid deposition is different on the average for particles of different sizes. When the contact material stream flowing on cone 34 reaches the funnel 32 it is forced to abruptly change the direction of its flow so that the material existing along the lower edge of the contact material stream on cone 34 becomes the surface material as the stream begins its now direction of flow on funnel 32. However, since this surface material in general contains fines accumulated on the underside of the stream on cone 34, the fines again begin to settle through the larger particles of contact material flowing downwardly on funnel 32. In this manner, particles from the underside of the contact material stream on cone 34 which contain a different percentage liquid oil deposition than the surface particles on cone 34 are caused to percolate through the surface particles from cone 34 when the stream reaches funnel 32. This continuous intermixing of all the contact material particles is repeated every time the contact material stream is forced to abruptly reverse its direction of flow so that by the time the contact material reaches the basin 40, the liquid oil is substantially uniformly distributed over all of the contact material particles regardless of their size. Uniform distribution of the contact material bearing liquid oil over all portions of the column of contact material 60 within the conversion chamber is insured by means of basin 40 and pipes 41. Spent contact material is withdrawn from the lower end of vessel 10 through conduit 45. The rate of contact material is throttled to the desired value by means of flow control valve 46. Since the pipes 41 from basin 40 terminate at the surface of column 60 and since the relative positioning of funnel 33 with respect to basin 40 is such as to prevent overflow of contact material over the sides of basin 40, and since the relative positioning of the cones and funnels and the shape of the funnels is such as to prevent overflow of contact material over the upper edges of the funnels 33 and 32, the throttling effect of the valve 46 is transmitted through the column 60 to pipes 41, and through the stream in pipes 41 and the bed in basin 40 to funnel 33 and from funnel 33 to cone 36 and from cone 36 to funnel 32 and so on up to conduit 38. Thus, there is maintained a continuity of substantially compact contact material body from the level of valve 46 through the entire conversion chamber to the inlet thereto at 38. Moreover, the continuity of solid body is then continued up to the hopper 11. In this manner, no throttling valves are required on leg 43 or on conduit 38 and the stream of contact material flowing over the vertical series of cones and funnels is a substantially compact continuous stream which is not interrupted at any level. The liquid hydrocarbon charge passes downwardly within the column 60 and is converted to lower boiling gaseous products which are withdrawn through collector members 51 and 52 and pipes 53 and 54, respectively. An inert purge gas such as steam or flue gas may be admitted through inlet 59 and distributor 58 to accomplish the stripping of gaseous hydrocarbon products from the outflowing spent contact material. A system of baffles adapted to insure uniform withdrawal of contact material from all portions of the horizontal cross-sectional area of the conversion zone may be provided within the lower section of the vessel 10. Several such baffle arrangements are shown in issued patents. An inert seal gas such as steam or flue gas may be introduced to the seal chamber 29 through pipe 61 at a rate controlled by diaphragm activated valve 62 and differential pressure controller 63 such as will maintain an inert gaseous pressure in zone 29 slightly higher (for example ¼–½ pound per square inch) than the gaseous pressure in the upper section of the conversion chamber.

When desired, a heated vaporized hydrocarbon charge may be introduced to the conversion chamber through conduit 50. The vapors pass downwardly through the space between funnels 32 and 33 and the shell of vessel 10 until it reaches the column 60. Since the vapors may freely contact the liquid bearing contact material on the cones 34 and 36 and on the basin 40, it may serve to pick up and sweep downwardly to column 60 any gaseous hydrocarbons formed by the cracking of high boiling liquid hydrocarbons on the contact material within its zig zag path of travel in the upper portion of the conversion zone. Mixed gaseous and liquid hydrocarbons pass downwardly within the column 60 to be converted to the desired ultimate products.

By the method and apparatus described hereinabove, the tendency for channeling of liquid and gaseous hydrocarbons through localized sections of the conversion zone is overcome and uniform conversion of all the reactant is insured. It will be apparent that the exact dimensions and positioning of the several elements of the combination apparatus of this invention may be subject to wide variation depending upon the particular operation conditions and materials for which the apparatus is to be employed. Certain general specifications may be given. The feed conduit 38 should terminate sufficiently close to the apex of the uppermost cone 34 and the cone 34 should be of such dimensions that the maximum thickness of the contact material stream flowing on the cone is less than about 6 inches and preferably less than 2 inches. This thickness of the contact material stream also depends upon the normal angle of repose of the contact material and the slope of the sides of the cone. The angle of repose of clay type and gel type contact materials falls generally in the range about 25 to 40 degrees depending on the material. In general, the side wall of the cone 34 and of cone 36 should be of the order of 40 degrees or greater with the horizontal and preferably not greater than about 60 degrees. The slope of the side walls of funnels 32 and 33 should also be of the order of 40 to 60 degrees. A vertical skirt may be provided, if desired, at the upper end of the funnels to help retain contact material. The funnels 32 and 33 should be so positioned as to prevent overflow of contact material over their upper edges. For example, if a contact material having an angle of repose of 30 degrees is employed, then the level of the upper edge of funnel 32 should be above the level of the intersection with the funnel wall of a line drawn downwardly at about 30 degrees with the horizontal from the nearest edge of conduit 38. The same relationship should be maintained between the downspout from funnel 32 and the upper edge of funnel 33 and between the downspout from funnel 33 and the edge of the side wall of basin 40. The cones should be of such diameter at their base with respect to the diameter of the funnels at the same level as to provide a substantial annular space for contact material flow between the base of the cone and the funnel. The funnels and the basin 40 should be of substantially less diameter than vessel 10 so as to provide ample room therebetween for gas flow to the column therebelow without causing a substantial pressure drop.

As an example of the application of this invention, its use in the catalytic cracking conversion of high boiling fluid hydrocarbons may be considered. In such an operation, a particle-form catalyst which may be of clay type is introduced into the conversion chamber at a temperature within the range about 900 to 1200° F. depending upon the desired conversion temperature, the clay to oil ratio and the particular hydrocarbon charge involved and the desired products. A liquid hydrocarbon charge which may consist principally of hydrocarbons boiling above the desired average conversion temperature is introduced through pipe 49. Such a charge may be a reduced petroleum crude which has been preheated to a temperature of the order of 600–800° F. A gas oil fraction which has been vaporized and heated to a temperature of the order of 800–950° F. may be introduced to the conversion chamber through conduit 50. Gaseous products containing high yields of gasoline may be withdrawn from the conversion chamber through conduits 53 and 54. The pressure in the conversion chamber may be controlled quite low, usually of the order of 5 to 30 pounds per square inch gauge. The total oil space velocity (measured as liquid oil at 60° F.) may be within the range about 0.5 to 10 volumes of oil per volume of flowing catalyst in the conversion zone. The relative ratio of liquid to gaseous hydrocarbon charge may vary widely depending upon specific refinery stock conditions. The catalyst to oil ratio on the weight basis may be within the range about 2.0 to 20 parts of catalyst charged per part of oil. In the regeneration zone, air may be employed to burn from the catalyst the carbonaceous contaminant formed thereon in the conversion zone. Sufficient heat should be withdrawn from the catalyst during regeneration to prevent it from reaching a heat damaging temperature. For clay-type catalysts, the heat damaging level is of the order of about 1200° F.

While the particular convertor described hereinabove is of cylindrical shape and the conical baffles and funnels are all of circular horizontal cross-sectional shape, it will be understood that convertors having other cross-sectional shapes may be employed in which case the baffles will be similarly modified. It is also contemplated that other baffle arrangements other than the cone and funnel arrangements may be employed within the scope of this invention provided that such other arrangements provide for the type of zigzag compact stream flow with abrupt directional changes which is provided by the preferred embodiment of the invention described hereinabove. It will be understood that the particular details of apparatus design and operating conditions and the examples of application of this invention given hereinabove are intended as illustrative and should not be construed as limiting the scope of this invention except as it may be limited by the following claims.

I claim:

1. A method for the conversion of high boiling fluid hydrocarbons to lower boiling gaseous hydrocarbon products in the presence of a moving particle-form contact material which method comprises: introducing particle-form contact material at a suitable temperature for supporting the hydrocarbon conversion into the upper section of a confined, elongated conversion zone, passing said contact material as a substantially compact continuous stream downwardly through an upper portion of said zone in a downwardly sloping zigzag path in which it is subject to abrupt change in direction of its downward flow, directing the flow of said compact stream onto the surface of a substantially compact accumulation of contact material therebelow in said conversion zone, passing contact material from the bottom of said accumulation as a plurality of compact streams to a plurality of points uniformly distributed on the surface of a substantially compact column of said contact material maintained in said conversion zone below said accumulation, withdrawing contact material from the lower section of said column at a controlled throttled rate so as to maintain continuity of compact contact material body from the location of withdrawl to the initial point of contact material introduction into said conversion zone, spraying a high boiling liquid hydrocarbon charge onto said contact material introduced to said conversion zone at a location near the beginning of its zigzag path of travel so as to become thoroughly mixed with the contact material by the time it reaches said column within said conversion zone, passing the hydrocarbons downwardly through said column to effect the desired conversion of said hydrocarbons to lower boiling gaseous hydrocarbon products, and withdrawing gaseous hydrocarbon products separately of said contact material from the lower section of said conversion zone.

2. A method for the conversion of high boiling fluid hydrocarbons to lower boiling gaseous hydrocarbon products in the presence of a moving particle-form contact material which method comprises: passing particle-form contact material at a suitable temperature for supporting said conversion as a substantially compact continuous stream in a downwardly sloping zigzag path in which it is subject to abrupt change in direction of its downward flow, directing the flow of said compact stream onto the surface of a substantially compact accumulation of contact material therebelow, passing contact material from said accumulation onto the surface of a substantially compact column of said contact material maintained in a confined, conversion zone below said accumulation, withdrawing contact material from the lower section of said column at a controlled throttled rate so as to maintain continuity of compact contact material body from the location of withdrawal to the initial point of contact material introduction into said conversion zone, spraying a high boiling liquid hydrocarbon charge onto said contact material flowing in said zigzag path at at least one location along said zigzag path of travel so as to become thoroughly mixed with the contact material by the time it reaches said column within said conversion zone, passing the hydrocarbons downwardly within said column to effect the desired conversion of said hydrocarbons to lower boiling gaseous hydrocarbon products, and withdrawing gaseous hydrocarbon products separately of said contact material from said conversion zone.

3. A method for the conversion of high boiling fluid hydrocarbons to lower boiling gaseous hydrocarbon products in the presence of a moving particle-form contact material which method comprises: introducing particle-form contact material at a suitable temperature for supporting the hydrocarbon conversion into a confined seal zone, passing a contact material as a substantially compact stream downwardly from said seal zone to the upper section of an elongated confined conversion zone therebelow, directing the contact material from said stream downwardly through a central portion of the upper section of said conversion zone as a substantially compact, continuous stream which flows alternately radially outwardly and radially inwardly over downwardly inclined surfaces until it reaches the surface of a laterally confined accumulation of said contact material maintained therebelow within a central portion of the horizontal cross-sectional area of said conversion zone, passing contact material from the bottom of said accumulation as a plurality of confined compact streams downwardly onto the surface of a column of said contact material maintained therebelow in said conversion zone, said streams delivering contact material onto said column at a plurality of spaced apart locations uniformly distributed over the horizontal cross-sectional area of said column, spraying a high boiling liquid hydrocarbon onto said contact material near the location of its introduction into said conversion zone from said seal zone, withdrawing gaseous hydrocarbon products from the lower section of said conversion zone, substantially separately withdrawing used contact material from the lower section of said conversion zone as a substantially compact stream and throttling the rate of said last named stream so as to maintain a continuous compact body of contact material upwardly from the location of said throttling through the conversion zone to the location of contact material introduction thereinto from said seal zone, and maintaining a substantially inert gaseous atmosphere in said seal zone.

4. A method for the conversion of high boiling fluid hydrocarbons to lower boiling gaseous hydrocarbon products in the presence of a moving particle-form contact material which method comprises: introducing particle-form contact material at a suitable temperature for supporting the hydrocarbon conversion into the upper section of a confined, elongated conversion zone, passing said contact material as a substantially compact continuous stream downwardly through an upper portion of said zone in a downwardly sloping zigzag path in which it is subject to abrupt change in direction of its downward flow, directing the flow of said compact stream onto the surface of a substantially compact column of contact material maintained within said conversion zone, withdrawing used contact material from the lower section of said conversion zone at a controlled rate, spraying a liquid hydrocarbon charge onto said contact material introduced to said conversion zone at a location near the beginning of its zigzag path of travel so as to become thoroughly mixed with the contact material by the time it reaches said column within said conversion zone, introducing a heated hydrocarbon charge in the gaseous phase into the upper section of said conversion zone and passing the gaseous hydrocarbon charge downwardly past said compact stream of contact material flowing in said zigzag path and into said column of contact material, passing both liquid and gaseous hydrocarbons downwardly within said column to effect conversion of said hydrocarbons to lower boiling gaseous hydrocarbons, and withdrawing gaseous hydrocarbon products separately of said contact material from the lower section of said conversion zone.

5. A method for the conversion of high boiling fluid hydrocarbons to lower boiling gaseous hydrocarbon products in the presence of a moving particle-form contact material which method comprises: introducing particle-form contact material at a suitable temperature for supporting the hydrocarbon conversion into the upper section of a confined, elongated conversion zone, passing said contact material downwardly through an upper section of said conversion zone as a substantially compact, continuous stream which flows alternately radially outwardly from the center of said zone and radially inwardly toward the center of said zone over downwardly sloping surfaces so that with each change in the direction of flow, the smaller particles of contact material which tend to settle towards the bottom edge of said stream are brought to the surface of said stream, said stream being laterally confined to a central portion of the horizontal cross-sectional area of said conversion zone, directing the flow of said compact stream onto the surface of a substantially compact bed of contact material, said bed being laterally confined to a central portion of the horizontal cross-sectional area of said zone, passing contact material from the bottom of said bed as a plurality of compact streams delivering at a plurality of uniformly spaced locations onto the surface of a substantially compact column of said contact material maintained therebelow in said conversion zone, withdrawing contact material from the lower section of said column at a controlled throttled rate so as to maintain continuity of compact contact material body from the location of withdrawal to the initial point of contact material introduction into said conversion zone, spraying a high boiling liquid hydrocarbon charge onto said contact material in the upper section of said conversion zone near the location of its introduction into said conversion zone so that said hydrocarbons may be thoroughly mixed with the contact material before it reaches the surface of said column, introducing a heated gaseous hydrocarbon into the upper section of said conversion zone at a level substantially above the surface of said column, passing liquid and gaseous hydrocarbons downwardly within said column to effect conversion to lower boiling gaseous hydrocarbon products, and withdrawing gaseous hydrocarbon products from the lower section of said conversion zone, substantially separately of said contact material.

6. A method for the catalytic conversion of high boiling fluid hydrocarbons in the presence of a particle-form catalyst material which comprises: maintaining an accumulation of particle-form catalyst in a confined seal zone and maintaining a substantially compact column of said catalyst in a lower portion of a confined upright conversion zone therebelow, supplying regenerated catalyst to said seal zone at a temperature sufficiently high to support said fluid hydrocarbon conversion, passing catalyst as a substantially compact, confined stream from said seal zone to a location within the upper section of said conversion zone, substantially above the level of said column therein, passing said catalyst as a substantially compact continuous stream downwardly over a series of surfaces maintained within a central portion of the upper section of said conversion zone, which surfaces alternately slope downwardly radially away from the horizontal center of said zone and radially towards the center of said zone, directing the flow of said compact stream from the last of said sloping surfaces onto a substantially compact bed of said catalyst laterally confined to the central portion of the horizontal cross section of said conversion zone, withdrawing catalyst from the bottom of said bed as a plurality of uniformly spaced streams delivering onto the surface of said column of catalyst within said conversion zone, withdrawing used catalyst from the lower end of said conversion zone at a throttled rate so as to maintain continuity of compact catalyst body throughout the entire length of said conversion zone, spraying heated liquid hydrocarbons onto the catalyst flowing on the uppermost of said sloping surfaces in the upper section of said conversion zone so that said liquid may be thoroughly mixed with the downflowing catalyst before it reaches said column, introducing heated, vaporized hydrocarbons into the upper section of said conversion zone above said column, passing liquid and gaseous hydrocarbons downwardly within said column to effect conversion thereof, withdrawing gaseous hydrocarbon products from the lower section of said conversion zone, maintaining blankets of substantially inert gaseous material in said seal zone and in said conversion zone below the level of gaseous hydrocarbon withdrawal, to substantially prevent escape of gaseous hydrocarbons from the ends of said conversion zone, passing the catalyst withdrawn from said conversion zone through a separate regeneration zone under controlled elevated temperature conditions while contacting said catalyst with an oxygen containing gas to burn off from said catalyst the contaminant deposited thereon in said conversion zone, and returning regenerated catalyst at a temperature suitable for supporting the hydrocarbon conversion to said seal zone.

7. An apparatus for conversion of high boiling fluid hydrocarbons to lower boiling hydrocarbons in the presence of a moving particle-form contact material which apparatus comprises in combination: means defining an elongated conversion chamber adapted to confine a substantially compact column of contact material therein, baffle means within the upper section of said conversion chamber adapted to define a downwardly sloping zigzag passage for contact material flow, which passage is restricted laterally to a central portion of said chamber, below said baffle means a basin adapted to laterally confine to a central portion of said chamber a bed of said contact material, a plurality of conduits for solid flow extending downwardly from said basin and terminating at a substantially common level at a plurality of points uniformly distributed over the horizontal cross-sectional area of said chamber, means to supply contact material to the upper end of said chamber above said baffle means, means to withdraw contact material from the lower section of said chamber, flow control means associated with said withdrawal means, means to spray liquid hydrocarbons onto the contact material near the upper end of said zigzag passage defined by said baffle means and means to withdraw gaseous hydrocarbons from the lower section of said conversion chamber substantially separately of said contact material.

8. An apparatus for conversion of high boiling fluid hydrocarbons to lower boiling hydrocarbons in the presence of a moving particle-form contact material which apparatus comprises in combination: means defining an elongated conversion chamber adapted to confine a substantially compact column of contact material therein, baffling positioned within a central portion of the upper section of said conversion chamber adapted to define a central passage for downward solid flow through the upper section of said conversion chamber which passage slopes downwardly alternately radially outward from the center of said chamber and radially inward toward the center thereof, a receptacle positioned within a horizontally central portion of said chamber at a level below said baffling, said receptacle being open on top to receive the solid flow from the passage defined by said baffling, a plurality of uniformly spaced apart outlets on the bottom of said receptacle for flow of contact material to the portion of the conversion chamber therebelow, means to withdraw contact material from the lower section of said chamber at a controlled rate, means defining a seal chamber above said conversion chamber, means to supply contact material to said seal chamber, means to introduce an inert gas into said seal chamber, conduit means for flow of contact material from said seal chamber to said passage defined by said baffling in said conversion chamber, spray means in the upper section of said conversion chamber adapted to spray liquid hydrocarbon charge onto said contact material in said passage defined by said baffling, means to supply liquid hydrocarbon charge to said spray means, and means to withdraw gaseous hydrocarbons from the lower section of said conversion chamber.

9. An apparatus for conversion of high boiling fluid hydrocarbons to lower boiling hydrocarbons in the presence of a moving particle-form contact material which apparatus comprises in combination: means defining an elongated conversion chamber adapted to confine a substantially compact column of contact material therein, baffle means within the upper section of said conversion chamber adapted to define a downwardly sloping zigzag passage for contact material flow, which passage is restricted laterally to a central portion of said chamber, below said baffle means a basin adapted to receive contact material from said passage defined by said baffle means, and adapted to laterally confine a bed of contact material within a central portion of the cross-sectional area of said chamber, a plurality of uniformly distributed outlets on the bottom of said basin for flow of contact material therefrom to the portion of said chamber therebelow, conduit means for supply of contact material to the upper end of said passage defined by said baffle means, conduit means for withdrawal of contact material from the lower section of said chamber, flow throttling means associated with said last named conduit means, a liquid spray device positioned within the upper section of said conversion chamber adapted to spray liquid hydrocarbons into the upper section of said passage defined by said baffle means, an inlet conduit for gaseous hydrocarbons connected to the upper section of said chamber and means to withdraw gaseous products from the lower section of said chamber.

10. An apparatus for conversion of high boiling fluid hydrocarbons to lower boiling hydrocarbons in the presence of a moving particle-form contact material which apparatus comprises in combination: means defining an elongated conversion chamber adapted to confine a substantially compact column of contact material therein, a vertical series of spaced alternate upright conical baffles and funnels positioned within a laterally central portion of the upper section of said chamber, said conical baffles being positioned to direct the flow of contact material flow into the funnel next below and said funnels being positioned to direct the flow of contact material onto the apex of the conical baffle next below, a basin positioned in a laterally central portion of said chamber below said series of conical baffles and funnels to receive the contact material flow, said basin being adapted to laterally confine said contact material to a central portion of said chamber, a plurality of spaced apart conduits depending from said basin and terminating at a common level in said chamber therebelow, conduit means for supply of contact material into the upper section of said chamber at a location substantially centrally above the uppermost conical baffle, a liquid spray device positioned within the upper section of said chamber in such a manner as to direct a spray of liquid hydrocarbons downwardly towards said uppermost conical baffle, conduit means for withdrawal contact material from the lower section of said chamber, flow throttling means associated with said last named conduit means, and separate means for withdrawal of gaseous material from the lower section of said chamber.

11. An apparatus for conversion of high boiling fluid hydrocarbons in the presence of a moving particle-form contact material which comprises in combination, a substantially vertical, elongated vessel closed on either end, partitioning within the upper section of said vessel providing a seal chamber in the upper end of said vessel and a conversion chamber therebelow, means to supply contact material to said seal chamber against the pressure therein, means to maintain a substantially inert gaseous atmosphere in said seal chamber, a substantially centrally positioned conduit extending downwardly from said partitioning for flow of contact material from said seal chamber to the upper section of said conversion chamber, directly below the lower end of said conduit within the upper section of said conversion chamber a centrally positioned series of alternate upright cones and funnels, said cones and funnels being so spaced apart that each cone directs solid flow into a funnel therebelow and the funnels direct solid flow to the cones therebelow, said funnels being further so positioned as to prevent overflow of contact material from their upper edges, a basin positioned in a laterally central portion of said chamber below said series of conical baffles and funnels to receive the contact material flow, said basin being adapted to laterally confine said contact material to a central portion of said chamber, a plurality of spaced apart conduits depending from said basin and terminating at a common level in said chamber therebelow, conduit means for withdrawal of contact material from the lower section of said conversion chamber, flow throttling means associated with said last named conduit means, a liquid spray device positioned within said conversion chamber adapted to spray liquid hydrocarbon charge uniformly onto the contact material flowing over the surface of the uppermost of said cones, means to supply liquid hydrocarbons to said spray device, means to introduce gaseous hydrocarbons to the upper section of said conversion chamber at a location above the uppermost of said cones, and means to separately withdraw gaseous material from the lower section of said conversion chamber.

12. A method for conversion of high boiling fluid hydrocarbons to lower boiling gasiform hydrocarbon products in the presence of a moving particle-form contact material which method comprises: passing particle-form contact material in heated condition as a substantially compact continuous stream downwardly in a zigzag path in which it is subject to abrupt change in direction of its downward flow, distributing a high boiling liquid hydrocarbon charge onto said contact material flowing in said zigzag path so as to become thoroughly mixed with the contact material flowing in said zigzag path, passing said mixed contact material and liquid hydrocarbon charge onto the surface of a substantially compact column of said contact material maintained in a confined conversion zone, withdrawing contact material from the lower section of said column at a controlled rate so as to cause the mixed contact material and oil delivered to the surface of said column to pass downwardly within said conversion zone, and withdrawing gasiform reaction products from said conversion zone.

13. A method for conversion of high boiling fluid hydrocarbons to lower boiling gasiform hydrocarbon products in the presence of a moving particle-form contact material which method comprises: passing particle-form contact material in heated condition as a substantially compact continuous stream downwardly in a zigzag path in which it is subject to abrupt change in direction of its downward flow, distributing a high boiling liquid hydrocarbon charge onto said contact material flowing in said zigzag path so as to become thoroughly mixed with the contact material flowing in said zigzag path, maintaining a substantially compact column of said contact material in a confined conversion zone, withdrawing used contact material from the lower section of said column at a controlled rate, replenishing said column by passing said mixed contact material and liquid hydrocarbon charge onto the surface thereof in said confined conversion zone, and withdrawing gasiform conversion products from the lower section of said conversion zone.

14. A method for conversion of high boiling fluid hydrocarbons to lower boiling gasiform hydrocarbon products in the presence of a moving particle-form contact material which method comprises: passing particle-form contact material at a temperature suitable for supporting the hydrocarbon conversion as a substantially compact continuous stream downwardly in a zigzag path in which it is subject to abrupt change in direction of its flow, distributing a high boiling hydrocarbon in the liquid phase onto said contact material flowing in said zigzag path so as to become uniformly distributed over substantially all of said contact material flowing in said zigzag path, passing said contact material along with said liquid charge uniformly distributed over said contact material as a plurality of substantially compact gravity flowing streams to a plurality of points uniformly distributed on the surface of a substantially compact column of said contact material maintained in a confined conversion zone, withdrawing contact material from the lower section of said column at a controlled rate so as to cause said contact material and hydrocarbons to move downwardly within said conversion zone and withdrawing gasiform hydrocarbon products formed in said conversion zone from said conversion zone substantially separately of said contact material.

15. An apparatus for conversion of high boiling fluid hydrocarbons to lower boiling hydrocarbons in the presence of a moving particle-form contact material which apparatus comprises in combination: means defining an elongated conversion chamber adapted to confine a substantially compact column of contact material therein, baffle means within the upper section of said conversion chamber adapted to define a downwardly sloping zigzag passage for contact material flow, below said baffle means a basin adapted to laterally confine a bed of said contact material, a plurality of conduits for solid flow extending downwardly from said basin and terminating at a substantially common level at a plurality of points uniformly distributed over the horizontal cross-sectional area of said chamber, means to supply contact material to the upper end of said chamber above said baffle means, means to withdraw contact material from the lower section of said chamber, flow control means associated with said withdrawal means, means to spray liquid hydrocarbons onto the contact material at at least one level along said zigzag passage defined by said baffle means and means to withdraw gaseous hydrocarbons from said conversion chamber.

ERNEST UTTERBACK.